(12) United States Patent
Yoshimura et al.

(10) Patent No.: US 7,805,524 B2
(45) Date of Patent: Sep. 28, 2010

(54) DISPLAY CONTROL APPARATUS, DISPLAY CONTROL PROGRAM AND DISPLAY CONTROL METHOD

(75) Inventors: Katsuyoshi Yoshimura, Kawasaki (JP); Tomoyuki Yazawa, Maebashi (JP); Tsuyoshi Kaseda, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 284 days.

(21) Appl. No.: 12/098,617

(22) Filed: Apr. 7, 2008

(65) Prior Publication Data

US 2009/0006649 A1 Jan. 1, 2009

(30) Foreign Application Priority Data

Jun. 28, 2007 (JP) ............................. 2007-170489

(51) Int. Cl.
*G06F 15/13* (2006.01)
(52) U.S. Cl. .................. 709/228; 709/203; 709/223; 709/225; 709/227; 709/242; 715/749
(58) Field of Classification Search ................ 709/203, 709/223, 225, 227, 228, 242; 715/749
See application file for complete search history.

(56) References Cited

U.S. PATENT DOCUMENTS

| 5,987,513 | A | * | 11/1999 | Prithviraj et al. | ............ 709/223 |
| 5,996,016 | A | * | 11/1999 | Thalheimer et al. | ......... 709/227 |
| 6,466,966 | B1 | * | 10/2002 | Kirsch et al. | ................ 709/203 |
| 6,763,388 | B1 | * | 7/2004 | Tsimelzon | ................... 709/228 |
| 6,941,369 | B1 | * | 9/2005 | Krack et al. | ................ 709/225 |
| 7,010,604 | B1 | * | 3/2006 | Munger et al. | .............. 709/227 |
| 7,089,325 | B1 | * | 8/2006 | Murtza et al. | ............... 709/242 |
| 2003/0200301 | A1 | * | 10/2003 | Trzcinko et al. | ............ 709/223 |
| 2007/0124364 | A1 | | 5/2007 | Hackworth et al. | ......... 709/203 |

FOREIGN PATENT DOCUMENTS

EP 0 996 253 4/2000

(Continued)

OTHER PUBLICATIONS

Braband, C. et al., *A runtime system for interactive Web services*, Computer Networks, Elsevier Science Publishers B.V., Amsterdam, NL, vol. 31, No. 11-16, pp. 1391-1401, May 17, 1999 (11 pp).

(Continued)

*Primary Examiner*—Jinsong Hu
(74) *Attorney, Agent, or Firm*—Staas & Halsey LLP

(57) ABSTRACT

A display control apparatus, a display control program and a display control method can prevent re-controlling of a CGI from taking place as a result of updating a web browser. The display control apparatus includes a CGI processing section that executes a CGI process and outputs the outcome of the CGI process in response to a CGI request received from the client, an address shifting section that connects the apparatus to a link address different from the address connected by the client to issue the CGI request according to the CGI request and an output section that outputs display information for displaying predetermined information according to the outcome of the CGI process output from the CGI processing section to the client for whom the address to be connected is shifted by the address shifting section.

13 Claims, 8 Drawing Sheets

FOREIGN PATENT DOCUMENTS

JP        2001-229103        8/2001

OTHER PUBLICATIONS

Edwards, P., *DIY Intranets with CFML/XML/HTML/CGI/ASP/JSP*, Vine, No. 119, pp. 53-60 (8 pp).

Ivengar, A., Dynamic Argument Embedding: Preserving State on the World Wide Web, IEEE Internet Computing, IEEE Service Center, New York, NY, vol. 1, No. 2, pp. 50-56 (7 pp).

Extended European Search Report dated Oct. 7, 2008 in corresponding European Patent Application No. 08153493.5 (8 pp).

* cited by examiner

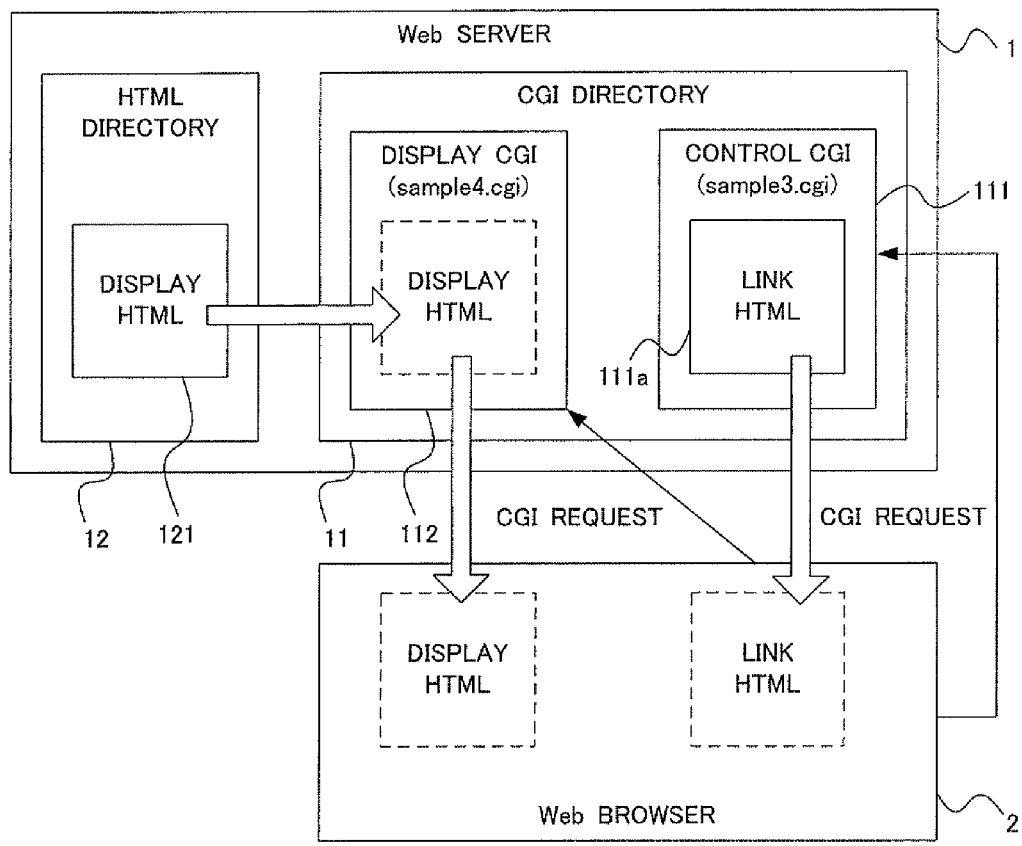

FIG.3

```
<html>
<head>
</head>
<body>
<font size="4"><strong>Power Control
<br>
<br>
</strong></font>
<table width="100%" border="1">
  <tr><td bgcolor="#CCFFFF">Server Name</td>
     <td bgcolor="#CCFFFF">Power Status</font></td>
     <td bgcolor="#CCFFFF">Power Control</font></td>
  </tr>                      DISPLAY OF OUTCOME
  <tr><td>Server#1</td>
          <td><%FORM:POWER%></td>
CONTROL
  CGI    <td><form name="form1" method="post" action="location.href='/
     html.cgi/sample3.cgi'">
          <input name="POWER" type="submit" id="POWER" value="On">
          <br>
          <input name="POWER" type="submit" id="POWER" value="Off">
          </form></td>
  </tr>                                            Off         On
</table>                                         BUTTON      BUTTON
<font size="4"><strong>
</strong></font>
</body>
</html>
```

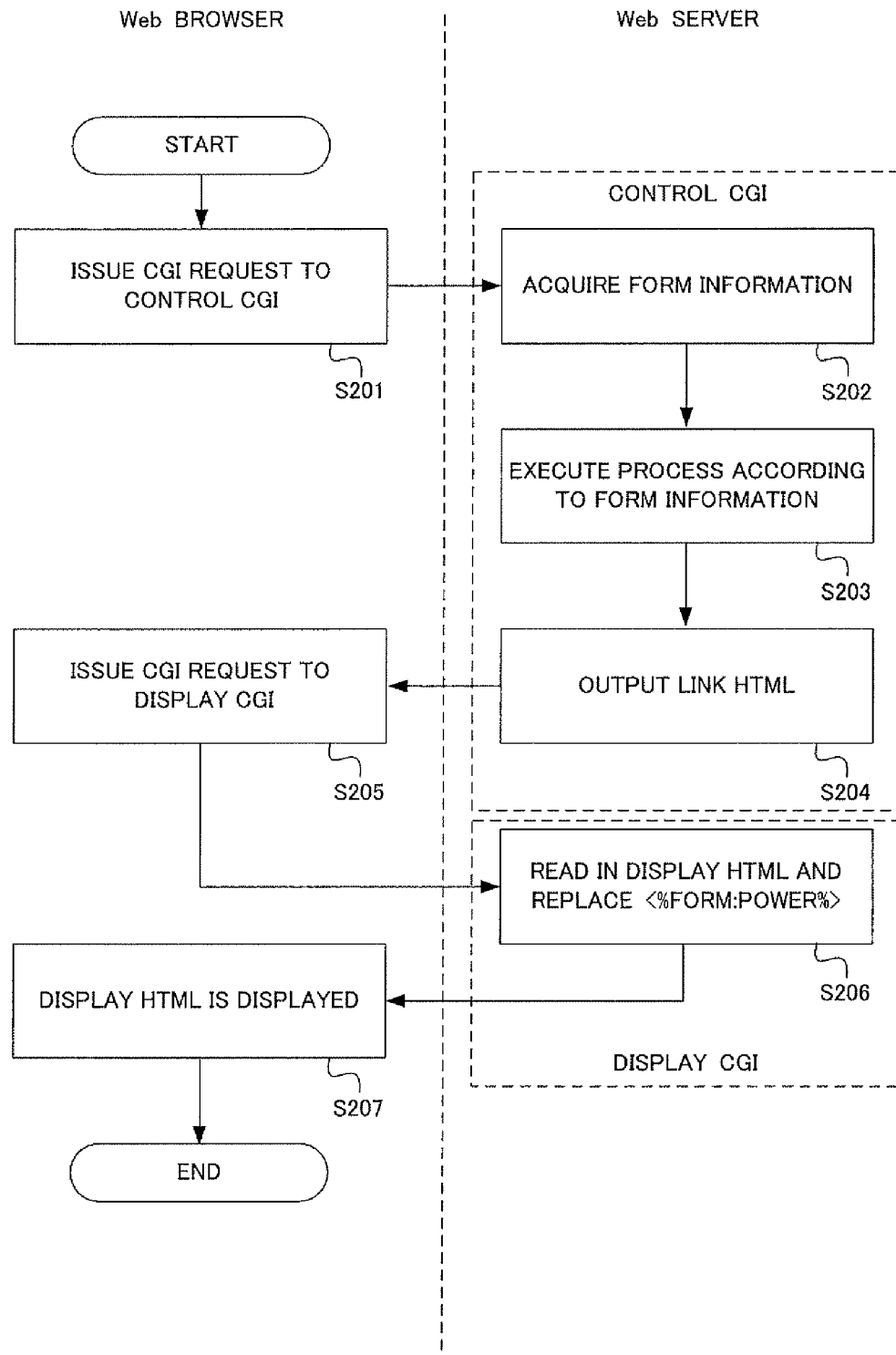

FIG.6

```
<html>
<head>
<script language="JavaScript">
<!--
  if (<%FORM:DIAFLAG%> > 0) {
  location.href="/html.cgi/sample6.cgi?DIAFLAG=0"
  }
// -->
</script>
</head>
<!--ACTUALLY DISPLAYED HTML MAIN BODY-->
<body>
<font size="4"><strong>Power Control
<br>
<br>
</strong></font>
<table width="100%" border="1">
  <tr><td bgcolor="#CCFFFF">Server Name</td>
    <td bgcolor="#CCFFFF">Power Status</font></td>
    <td bgcolor="#CCFFFF">Power Control</font></td>
  </tr>
    <tr><td>Server#1</td>
    <td><%FORM:POWER%></td>
    <td>
<form name="form1" method="post" action="location.href='/html.cgi/sample5.cgi?DIAFLAG=1'">
<input name="POWER" type="submit" id="POWER" value="On">
<br>
<input name="POWER" type="submit" id="POWER" value="Off">
    </form></td>
  </tr>
</table>
<font size="4"><strong>
</strong></font>
</body>
</html>
```

- FLAG: `<%FORM:DIAFLAG%>`
- DISPLAY CGI: `sample6.cgi`
- FLAG 0: `DIAFLAG=0`
- JavaScript (script block)
- DISPLAY OF OUTCOME: `<%FORM:POWER%>`
- CONTROL CGI: `sample5.cgi`
- FLAG 1: `DIAFLAG=1`
- On BUTTON / Off BUTTON

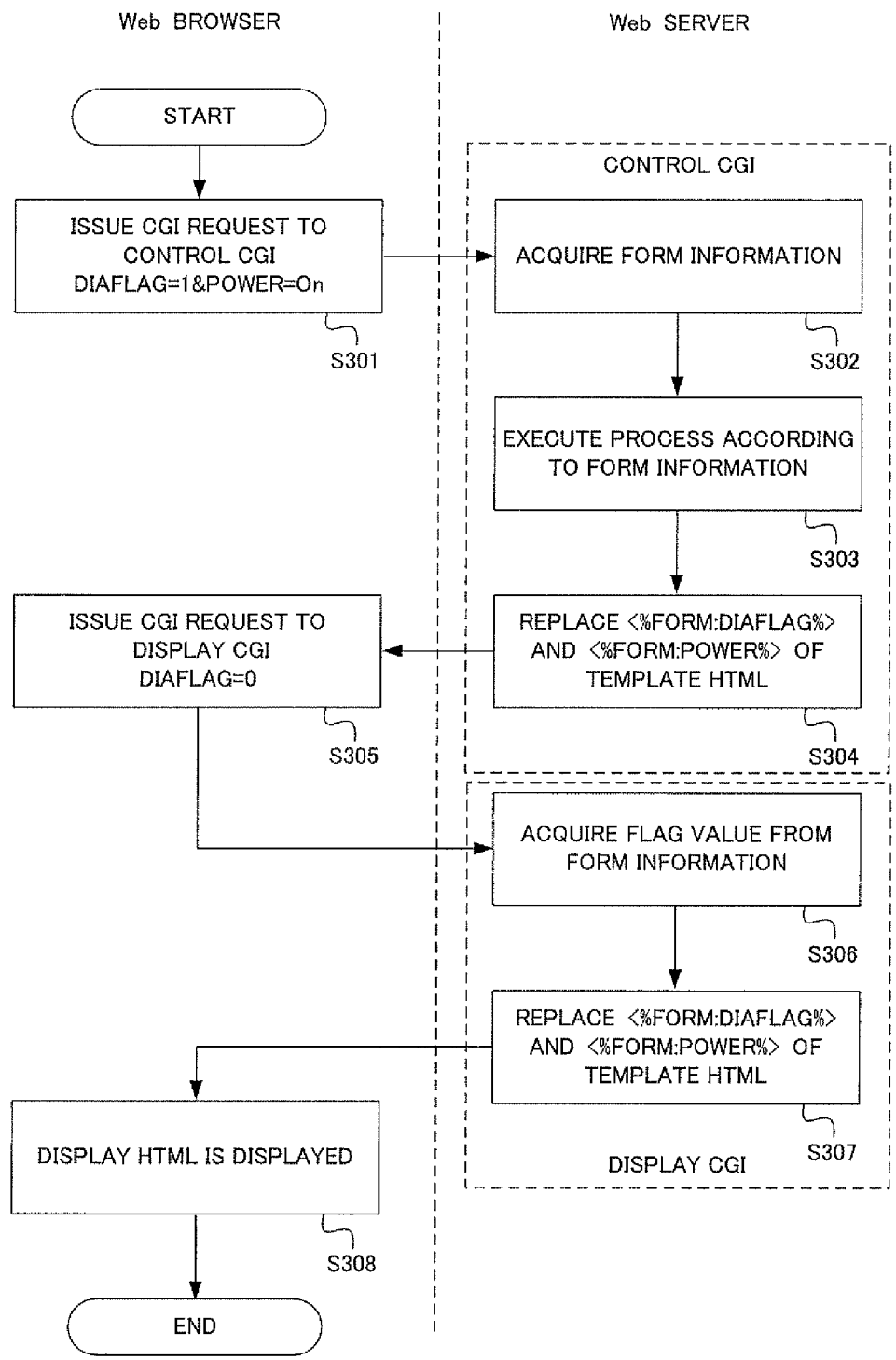

DISPLAY CONTROL APPARATUS, DISPLAY CONTROL PROGRAM AND DISPLAY CONTROL METHOD

This application claims the benefit of Japanese Patent Application No. 2007-170489, filed on Jun. 28, 2007 in the Japanese Patent Office, the entire disclosure of which is incorporated herein by reference.

BACKGROUND OF THE INVENTION

1. Field of the Invention

This invention relates to a display control apparatus, a display control program and a display control method.

2. Description of the Related Art

CGIs (common gateway interfaces) are known as interfaces for executing a user program on a web server. A CGI is a program installed in a server that executes a process in response to a CGI request from a web browser of a client and the web browser displays the HTML output by the user program so that a user of the client who requested the execution of the process can see the results of the execution at the web server on the web browser.

A method of avoiding double transmissions from a business use HTML screen on a web browser in known (see, for example, Patent Document: Jpn. Pat. Appln. Laid-Open Publication No. 2001-229103).

However, accessing of a file where a CGI program is written itself is a CGI request. Therefore, when a web browser is updated after executing a program, a multiple processing may occur at the web server as a similar CGI request is issued to the web server.

The web server may check a CGI request and returning an error in order to avoid such multiple processing. However, the web server cannot determine if a process is a normal process or an abnormal process when one or more normal processes coexist with one or more abnormal processes in a CGI request.

Now, an example of operation error that may occur due to a CGI request when a web browser is updated will be described below by referring to FIGS. 8 and 9.

FIG. 8 is a schematic illustration of a displayed image of a web browser on a display screen for controlling On and Off of a power supply of a computer. FIG. 9 is a flowchart of an operation error that might arise in a computer control by a web browser when a user inadvertently updates the web browser. Referring to FIG. 8, assume that web browser A and web browser B that are different from each other are adapted to control On/Off of the power supply to the computer, and the power supply to the computer is On in an initial condition.

As an Off button is clicked, the web browser A issues a power supply Off request to the computer being controlled by using a Web-UI (web-user interface) output from the CGI program as shown in FIG. 8 (S101). And when an On button is clicked, the web browser B issues a power supply On request to the computer just like the browser A in a state where the power supply of the computer is turned Off (S102).

Subsequently, the web browser A issues a power supply Off request (S103) and thereafter the web browser B issues a power supply On request (S104). Then, the web browser A updates the CGI to which it issued the power supply Off request while the web browser A accesses the CGI, holding the power supply Off request in Step S103, to consequently issue a power supply Off request (S105).

With the above-described method, the computer that is controlled by the user who operates the web browsers may determine such inadvertent update as an updating for re-controlling and an operation error may occur.

SUMMARY OF THE INVENTION

In view of the above-identified problem, it is therefore the object of the present invention to provide a display control apparatus, a display control program and a display control method that can prevent re-controlling a CGI from taking place as a result of updating a web browser.

In an aspect of the present invention, the above object is achieved by providing a display control apparatus including: a CGI processing section that executes a CGI process and outputs the outcome of the CGI process in response to a CGI request received from the client; an address shifting section that connects the apparatus to an address different from the link address connected by the client to issue the CGI request according to the CGI request; and an output section that outputs display information for displaying predetermined information according to the outcome of the CGI process output from the CGI processing section to the client for whom the address to be connected is shifted by the address shifting section.

In another aspect of the present invention, there is provided a display control program for causing a computer to execute: a CGI processing step that executes a CGI process and outputs the outcome of the CGI process in response to a CGI request received from the client; an address shifting step that connects the apparatus to a link address different from the address connected by the client to issue the CGI request according to the CGI request; and an output step that outputs display information for displaying predetermined information according to the outcome of the CGI process output in the CGI processing step to the client for whom the address to be connected is shifted in the address shifting step.

In still another aspect of the present invention, there is provided a display control method including: a CGI processing step that executes a CGI process and outputs the outcome of the CGI process in response to a CGI request received from the client; an address shifting step that connects the apparatus to a link address different from the address connected by the client to issue the CGI request according to the CGI request; and an output step that outputs display information for displaying predetermined information according to the outcome of the CGI process output in the CGI processing step to the user/client for whom the address to be connected is shifted in the address shifting step.

Thus, according to the present invention, there are provided a display control apparatus, a display control program and a display control method that can prevent re-controlling of a CGI from taking place as a result of updating a web browser by connecting the web browser to a different address after the processing operation of the related web server for a CGI request from the web browser.

BRIEF DESCRIPTION OF THE DRAWINGS

FIG. 1 is a schematic block diagram of system according to a first embodiment of the present invention;

FIG. 2 is a schematic illustration of an example of a source code of a link HTML;

FIG. 3 is a schematic illustration of an example of a source code of a display HTML;

FIG. 4 is a flowchart of the operation by the system of the first embodiment;

FIG. 6 is a schematic illustration of an example of a source code of a template HTML;

FIG. 7 is a flowchart of the operation by the system of the second embodiment;

DETAILED DESCRIPTION OF THE PREFERRED EMBODIMENTS

Now, preferred embodiments of the present invention will be described in detail by referring to the accompanying drawings.

First Embodiment

Firstly, the configuration of a system according to an embodiment will be described below.

Figure 8:
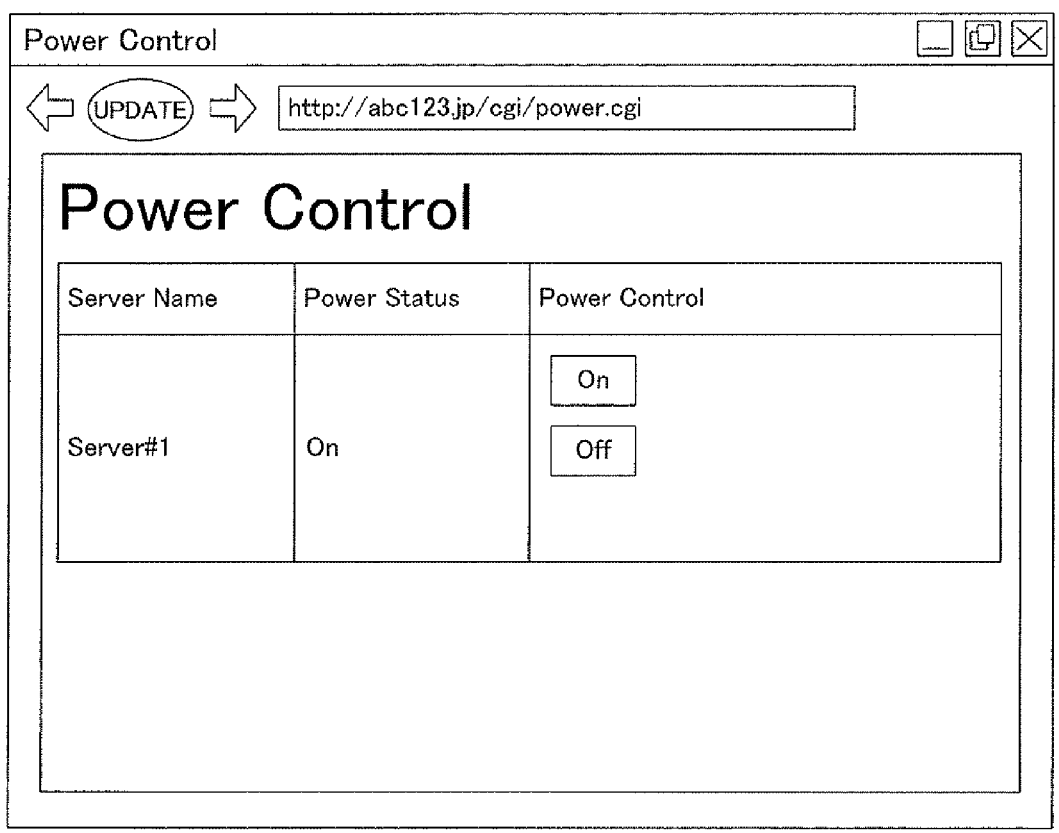
FIG. 8 is a schematic illustration of a displayed image of a web browser for controlling On/Off of the power supply of a computer on a display screen.
Figure 9:
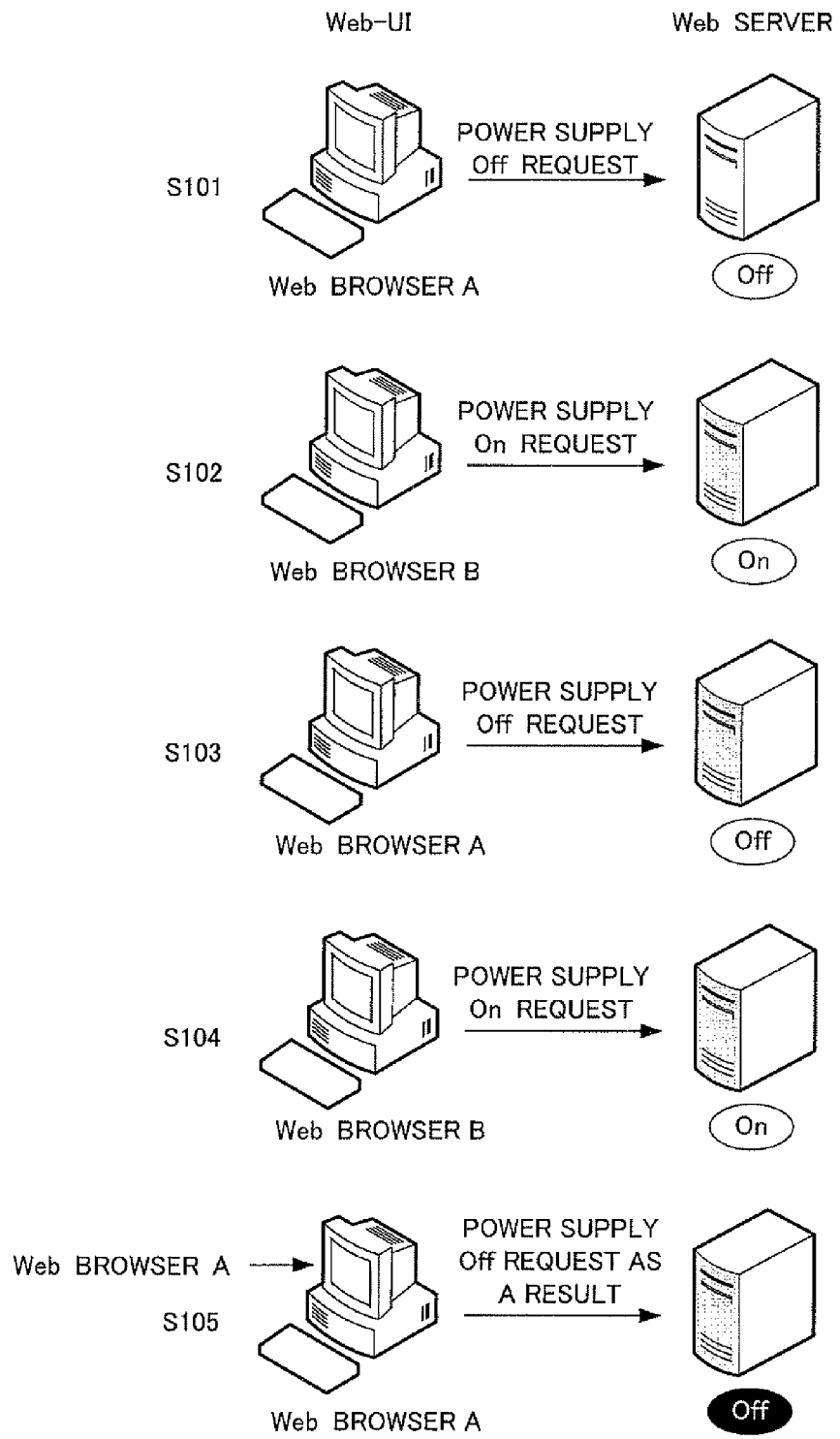
FIG. 9 is a flowchart of an operation error that might arise in computer control by a web browser when a user inadvertently updates the web browser.

FIG. 1 is a schematic block diagram of a system according to a first embodiment of the present invention, illustrating the overall configuration thereof. FIG. 2 is a schematic illustration of an example of a source code of the link HTML. FIG. 3 is a schematic illustration of an example of a source code of a display HTML. First embodiment is adapted to control the power supply of a computer by means of Web-UI as shown in FIG. 8.

As shown in FIG. 1, web server 1 has a CGI directory 11 and a HTML directory 12. The CGI directory 11 holds a control CGI 111 and a display CGI 112, and the HTML directory 12 holds a display HTML 121.

The source code of a link HTML 111a, which will be described in detail hereinafter, is written in the control CGI 111. Upon receiving a CGI request from a web browser 2 installed in a client that communicating with the web server 1, the control CGI 111 executes a predetermined process and outputs the link HTML 111a to the web browser 2. On the other hand, upon receiving a CGI request from the web browser 2, the display CGI 112 reads in a display HTML 121 from the HTML directory 12 as template and executes a predetermined process. Then, the display CGI 112 outputs the display HTML 121.

The link HTML 111a does not have any <body> tag as shown in FIG. 2, and a script for automatically jumping to the display CGI 112 is written in JavaScript in <head> tag.

As shown in FIG. 3, <% FORM:POWER %> is written in the display HTML 121 as source code. <% FORM:POWER %> is to be replaced by an outcome of a process by the display CGI 112. Additionally, a transmission button and a reception button that correspond respectively to an On button and an Off button shown in FIG. 8, and a link for jumping to the control CGI 111 when the buttons are depressed is written as source code.

The web browser 2 is a browser that issues a CGI request to the control CGI 111 and the display CGI 112 and can execute Java Scripts.

Now, the operation of the system of the first embodiment will be described below.

FIG. 4 is a flowchart of the operation of the system of the first embodiment. For the flowchart, it is assumed that a screen image for issuing a CGI request is already displayed in the web browser by the display CGI. Alternatively, an HTML for transmitting FORM information to the control CGI may perform a process shown in FIG. 4.

Firstly, the web browser 2 issues a CGI request to the control CGI 111 by a script shown below, using the GET method.

Location. href="html.cgi/sample3.cgi?POWER=On"

Upon receiving the CGI request, the control CGI 111 acquires a value "On" of POWER from the FORM information (S202), turns on the power supply of the computer according to the acquired value of POWER (S203) and outputs link HTML 111a to the web browser 2 (S204).

The web browser 2 issues a CGI request to the display CGI 112 by a script written in the received link HTML 111a (S205). Upon receiving the CGI request from the web browser 2, the display CGI 112 reads the display HTML 121 as template and replaces <% FORM:POWER %> by the outcome of the processing by the control CGI 111. The display CGI 112 then outputs the outcome of the processing to the web browser 2 (S206). The web browser 2 displays the display HTML 121 received from the display CGI 112 where the outcome of the processing is written (S207). At this time, <% FORM:POWER %> has been replaced by "On" indicating the status of the power supply of the computer. The value of POWER is transmitted from the web browser 2 to the control CGI 111 as the transmission button is depressed in Web-U1 by the display HTML 121.

Thus, in the first embodiment as described above, as the control CGI 111 is made to output the link HTML 111a to which the link to the display CGI 112 is written, jumping to the display CGI 112 takes place when the web browser 2 issues a CGI request. Therefore, information same as the CGI request to the control CGI 111 that the web browser 2 holds will not be sent to the control CGI 111. Thus, re-controlling of a CGI is prevented as a result of updating a web browser. As the transmission button of the display HTML 121 that the display CGI 112 outputs is depressed, a CGI request is issued to the control CGI 111 and a normal process is executed. Jumping to the display CGI 112 may be replaced by jumping to a predetermined HTML file that is prepared in advance.

Second Embodiment

While a link HTML and a display HTML are provided separately in the first embodiment, the functional feature of a link HTML and that of a display HTML are realized by a single template and re-controlling of a CGI is prevented from taking place as a result of updating a web browser by controlling the functional features by using flags in the second embodiment.

Now, the configuration of this embodiment will be described below.

Figure 5:
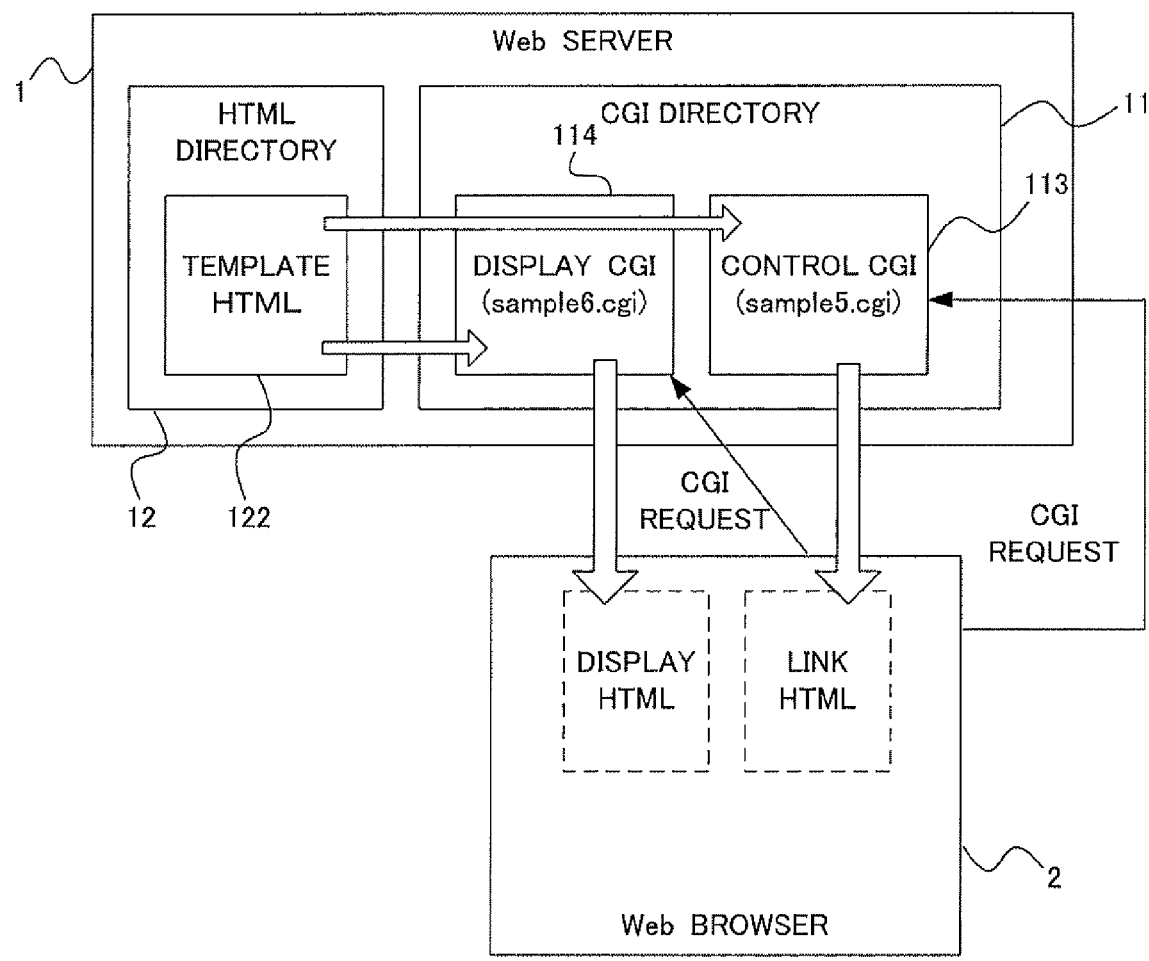
FIG. 5 is a schematic block diagram of a system according to a second embodiment.

FIG. 5 is a schematic block diagram of a system according to the second embodiment of the present invention, illustrating the overall configuration thereof. FIG. 6 is a schematic illustration of an example of a source code of a template HTML. Assume that, in the second embodiment, the power supply of a computer is controlled by using a Web-U1 as shown in FIG. 8 as in the case of the first embodiment.

Referring to FIG. 5, the Web server 1 has a CGI directory 11 and a HTML directory 12. The CGI directory 11 holds a control CGI 113 and a display CGI 114, and the HTML directory 12 holds a display HTML 122.

The control CGI 113 acquires FORM information such as flags or control information for a CGI request executes a predetermined process that corresponds to the CGI request and reads a template HTML 122, while it also acquires the power supply status information of the computer and rewrites and outputs the template HTML 122 according to the FORM information and the status information it acquires. The display CGI 114 acquires FORM information and the status information for a CGI request and rewrites and outputs the template HTML 122 according to the FORM information and the status information it acquires.

The flag of the template HTML 122 is determined by the JavaScript written in the <head> tag as shown in FIG. 6. When the value of the flag is equal to 1 (DIAFLAG=1), the web browser 2 jumps to the display CGI 114 and, at the same time, makes the value of the flag to 0. When the value of the flag is equal to 0 (DIAFLAG=0), the web browser 2 does not jump to the display CGI 114, and displays <body> tag and the items following the <body> tag, because no JavaScript is executed.

The web browser 2 is a browser that issues CGI requests to the control CGI 113 and the display CGI 114 and can executes JavaScript.

The operation of the system of the second embodiment will be described below.

FIG. 7 is a flowchart of the operation of the system the second embodiment. For the flowchart, it is assumed that the screen image for issuing a CGI request is already displayed in the web browser by the display CGI. Alternatively, it may be an HTML for transmitting FORM information to the control CGI.

Firstly, the web browser 2 issues a CGI request to the control CGI 113 by using a script shown below, using the GET method (S301).

Location. href="html.cgi/sample5.cgi? DIAFLAG=1 & POWER=On"

Upon receiving the CGI request, the control CGI 113 acquires the value "1" of DIAFLAG and the value "On" of POWER from the FORM information (S302). The control CGI then turns on the power supply of the computer according to the acquired value (S303), and reads in template HTML 122 from the HTML directory 12. Then, the control CGI 113 replaces <% FORM:DIAFLAG %> and <% FORM:POWER %> of the template HTML 122 respectively by "1" and "On" according to the acquired FORM information, and outputs the outcome of the processing to the web browser 2 (S304).

In the HTML output from the control CGI 113, the flag of JavaScript written in the <head> tag is equal to "1" (1st identifier) and hence the web browser 2 issues a CGI request to the display CGI 114 (S305). At the time of the CGI request, it hands over DIAFLAG=0 to the display CGI, using the GET method.

After acquiring the flag value "0" (2nd identifier) in response to the CGI request, the display CGI 114 further acquires status information "On" that indicates the power supply status of the computer from the web server (S306), reads in the template HTML 122, replaces <% FORM:DIAFLAG %> and <% FORM:POWER %> respectively by "0" and "On" and outputs the outcome of the processing to the web browser 2 (S307).

In the HTML output from the control CGI 113, the flag of JavaScript written in the <head> tag is equal to "0" and hence the web browser 2 skips the CGI request to the display CGI 114 to display the content of the <body> tag (S308). At the time of the request, <% FORM:POWER %> has been replaced by "On" indicating the status of the power supply of the computer. Additionally, the value of POWER and the flag "1" are transmitted to the control CGI 113 as the transmission button is depressed in the Web-U1 by the display HTML.

As described above, the web browser 2 determines the value of the flags by means of JavaScript in the second embodiment. It jumps to the display CGI 114 when the flag of the template HTML 122 is equal to "1" but skips the process of JavaScript when the flag is equal to "0" and display <body> tag and the following items of the template HTML 122. Thus, re-controlling of a CGI is prevented from taking place as a result of updating a web browser by providing a single template.

A program for causing a computer that operates as a display control apparatus to execute the above steps can be provided as a display control program. A computer that operates as a display control apparatus can be caused to execute the program when the program is stored in a computer-readable recording medium. Computer readable recording mediums that can be used for the purpose of the present invention include internal storage mediums to be installed in computers such as ROMs and RAMs, portable storage mediums such as CD-ROMs, flexible disks, DVDs, magneto-optical disks and IC cards, databases adapted to hold computer programs, other computers, the databases of such computers on communication lines.

What is claimed is:

1. A display control apparatus comprising:
a computer including:
    a CGI processing section that executes a CGI process and outputs an outcome of the CGI process in response to a CGI request received from a client;
    an address shifting section that connects the display control apparatus to a link address different from an address that the client connected to issue the CGI request, according to the CGI request; and
    an output section that outputs display information for displaying information according to the outcome of the CGI process output from the CGI processing section to the client for whom the address to be connected is shifted by the address shifting section, wherein
        the address shifting section includes a source code generating section that generates a source code for connecting the client to the link address different from the address that the client connected to issue the CGI request, and transmits the source code to the client,
        the source code generating section generates a source code containing information corresponding to the outcome of the CGI process and a first identifier for connecting the client to the link address, and
        the output section includes a source code rewriting section that rewrites the first identifier to a second identifier, and causing the client for whom the source code is executed to display the information corresponding to the outcome of the CGI process.

2. The apparatus according to claim 1, wherein the first identifier allows the client to skip a display process of displaying the information corresponding to the outcome of the CGI process.

3. The apparatus according to claim 1, wherein the client is a web browser that can execute an interpreter language.

4. The apparatus according to claim 1, wherein the address shifting section is HTML data.

5. The apparatus according to claim 1, wherein the first identifier and the second identifier are discriminated by an interpreter language.

6. A recording medium that records display control program, the display control program causing a computer to execute:
executing a CGI process and outputting an outcome of the CGI process in response to a CGI request received from a client;

address shifting by connecting the computer to a link address different from an address that the client is connected thereto to issue the CGI request, according to the CGI request; and outputting display information for displaying information corresponding to the output outcome of the CGI process output to the client for whom the address to be connected is shifted, wherein said address shifting includes generating a source code for connecting the client to the link address different from the address connected for the client to issue the CGI request and transmitting the source code to the client, said generating includes generating a source code containing information corresponding to the outcome of the CGI process, and a first identifier for connecting the client to the link address different from the address connected for the client to issue the CGI request, and said outputting display information includes rewriting the first identifier to a second identifier for the client for whom the source code is executed and connected and displaying the information corresponding to the outcome of the CGI process to the client.

7. The recording medium according to claim 6, wherein the first identifier allows the client to skip a display process of displaying the information corresponding to the outcome of the CGI process.

8. The recording medium according to claim 6, wherein said address shifting causes the computer to execute by means of HTML data.

9. The recording medium according to claim 6, wherein the first identifier and the second identifier are discriminated by an interpreter language.

10. A display control method including:

executing, by a computer, a CGI process and outputting an outcome of the CGI process in response to a CGI request received from a client;

address shifting by connecting, by a computer, to a link address different from an address connected by the client to issue the CGI request according to the CGI request; and outputting, by a computer, display information for displaying predetermined information according to the outcome of the CGI process output in said executing to the client for whom the address to be connected is shifted in said address shifting, wherein said address shifting includes generating a source code for connecting the client to the link address different from the address connected for the client to issue the CGI request and transmitting the source code to the client, said generating includes generating a source code containing information corresponding to the outcome of the CGI process and a first identifier for connecting the client to the link address different from the address connected for the client to issue the CGI request, and said outputting display information includes rewriting the first identifier to a second identifier for the client for whom the source code is executed and connected and displaying the information corresponding to the outcome of the CGI process to the client.

11. The method according to claim 10, wherein the first identifier allows the client to skip a display process of displaying the information corresponding to the outcome of the CGI process.

12. The method according to claim 10, wherein the client is a web browser that can execute an interpreter language.

13. The method according to claim 10, wherein said address shifting causes the computer to execute by means of HTML data.

* * * * *